No. 610,927. Patented Sept. 20, 1898.
O. W. SWANSON.
TROLLEY.
(Application filed Sept. 18, 1897.)
(No Model.)
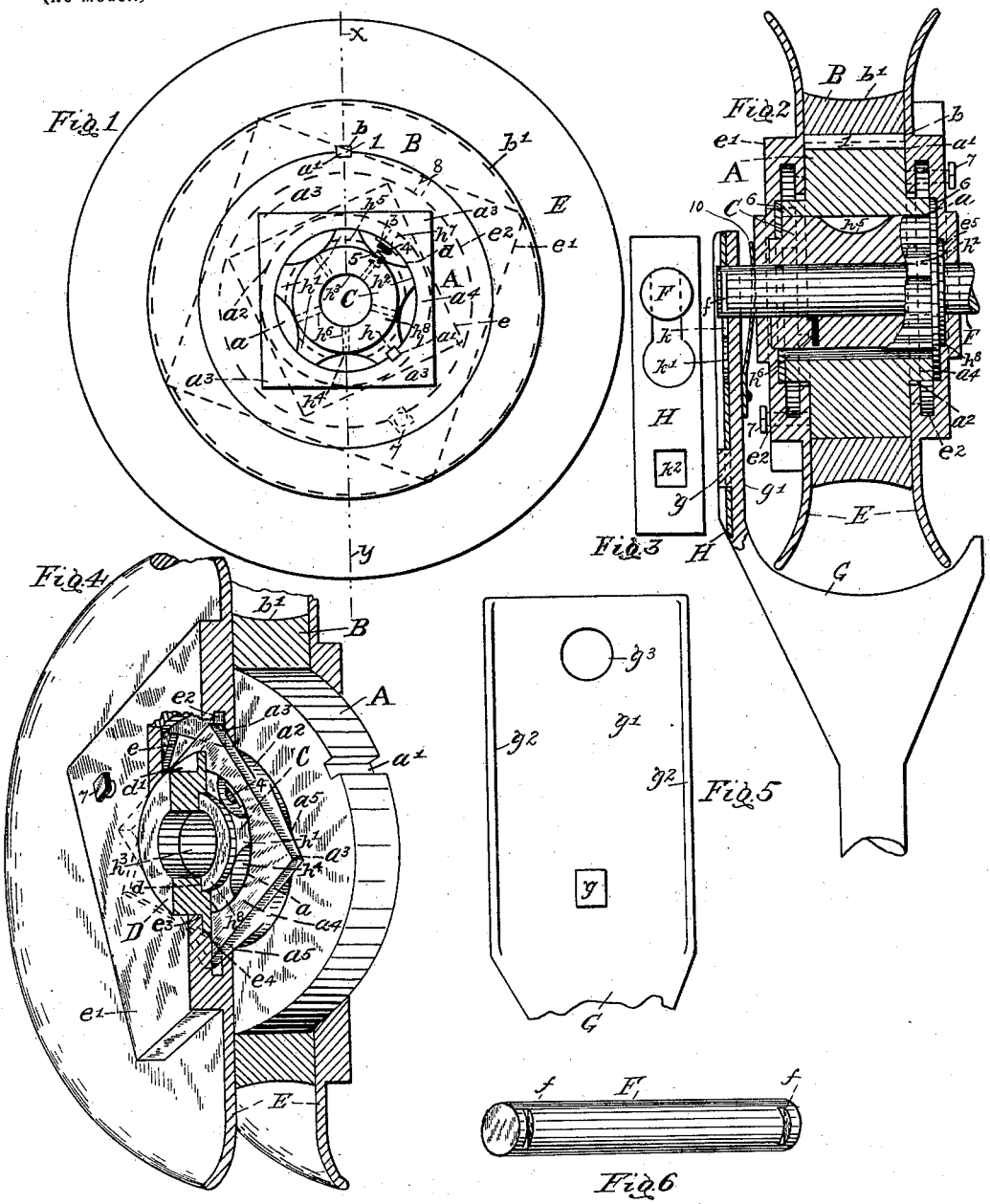
WITNESSES:
Samuel G. Dunsnap.
Clarence L. White.
INVENTOR
Olof W. Swanson
BY Frank E. Adams
ATTORNEY.

UNITED STATES PATENT OFFICE.

OLOF W. SWANSON, OF TACOMA, WASHINGTON.

TROLLEY.

SPECIFICATION forming part of Letters Patent No. 610,927, dated September 20, 1898.

Application filed September 18, 1897. Serial No. 652,112. (No model.)

*To all whom it may concern:*

Be it known that I, OLOF W. SWANSON, a citizen of the United States, residing at Tacoma, in the county of Pierce and State of Washington, have invented certain new and useful Improvements in Trolleys, of which the following is a specification, reference being had therein to the accompanying drawings.

My invention relates to improvements in trolleys adapted for travel upon an electric conductor for the purpose of diverting and transmitting the electric currents therefrom, and also relates to means for supporting such a trolley for rotation.

I have for the objects of my invention to provide a trolley composed of separable parts or elements which are so constructed and arranged that they may be readily separated and assembled, thereby providing for the instant replacement of any of the several elements comprising the trolley in case they become worn or broken, and in which provision is made for a perfect and continuous lubrication of the axle upon which the trolley is journaled without necessitating frequent application of the oil-can; also, to provide means whereby the aforesaid axle may be readily locked and unlocked in the yoke or head of the trolley-arm which supports the trolley in place against the electric conductor. I attain these objects by the construction and combination of parts illustrated in the accompanying drawings, in which—

Figure 1 is a side elevation of the trolley when assembled, but with one of the side flanges and the axle removed to disclose the center member or locking-center and the lugs thereon, the removable tire about said member, and the removable center core therein. Fig. 2 is a transverse section on line $x\,y$ of Fig. 1, but with a portion of the center core restored and the axle therein and a portion of the yoke or head of the trolley-pole shown in section to disclose the means employed to lock the axle in place. Fig. 3 is a front elevation of one of the lock-plates employed to secure the axle in place, one of same being used at each end of the axle. Fig. 4 is a perspective view of the trolley with portions of some of the parts comprising same broken away to disclose the positions of the several elements when assembled and locked together. Fig. 5 is a side elevation of the upper portion of one of the furcations of the yoke or head of the trolley-pole, indicating a lug thereon adapted to engage the lock-plate to secure the axle in position in the yoke; and Fig. 6 is a perspective view of the axle, indicating the grooves at each end thereof, which are adapted to engage the lock-plates when the axle is introduced in the slots thereof.

Similar letters and figures refer to similar parts throughout the several views.

Referring to the drawings, A indicates what I have termed the "center member" or "locking-center" of the trolley; B, the removable tire adapted to fit thereupon; C, the center core fitting a central aperture in the locking-center; D, the separable hubs opposing the ends of the center core and the locking-center; E, the side flanges adapted for attachment to the locking-center and to lock the several parts rigidly together; F, the axle upon which the trolley is mounted for rotation; G, the yoke or head of the trolley-pole, and H the lock-plates adapted to secure the axle F from rotation and end movement in the upper ends of the furcations of the yoke G.

The center member or locking-center A, I prefer to construct in annular form to provide a central aperture $a$, concentric with the outer periphery thereof, and in the inner and outer face thereof may be provided a keyway $a'$ to secure the contacting members to simultaneous rotation therewith, as will hereinafter be more fully set forth. At opposite sides of the center member A is provided a hub $a^2$, formed integral therewith, and securing-lugs, as $a^3$, in a raised position with reference to the side of the center. These lugs are indicated as comprising the four corners of a rectangular plate or disk $a^4$, with a central aperture equal in diameter to the opening $a$ and an outside diameter substantially the same as the hub $a^2$, thus projecting the corners or lugs $a^3$ beyond the perimeter of the hub. A portion of the under surface or face of each of these lugs $a^3$ diverges from the upper surface or face to form an incline corresponding to one face of a wedge, opposite sides of the locking-center being provided with similar hubs and lugs, but with the wedge-shaped surfaces $a^5$ thereon inclined in a reverse direction on opposite plates that the side flanges E may be locked thereto by simultaneous but opposing turns, as will be more fully described in the specification of the construction thereof.

The tire B is constructed with an internal diameter equal to that of the periphery of the locking-center A, about which it is adapted to fit snugly, and may be provided with a keyway $b$, adapted to register with the opposing way in the locking-center A and to receive a key 1 therein, for the purpose heretofore set forth. The tread or face $b'$ of the tire may be slightly concave to insure a central position of the electric conductor when operating thereon, and the width thereof is equal to that of the face of the center member A.

In the central aperture $a$ of the center member A the center core C is adapted to fit, and is provided with a keyway $h$, adapted to register with a similar incision $a'$, provided in the bore $a$, for the purpose heretofore described. This center core C is provided with longitudinal ribs $h'$, the outer surface $h^2$ thereof being concentric with the bore $h^3$ of the core and adapted to fit within the aperture $a$, as above stated, the ribs $h'$ providing oil-channels $h^4$ therebetween which communicate through central depressions $h^5$, provided in each rib and forming a chamber or reservoir for the lubricant. Thus the oil injected in either channel may flow completely about the central core, as the ends of the channels are closed by suitable means hereinafter described.

Suitable oilways $h^6$ are provided in the wall of the center core C, affording a passage for the oil from the chamber above described to the bore of the core for the lubrication of the axle contained therein, and a feedway $h^7$ is provided in the hub $a^2$ of the locking-center A, which communicates with said chamber, and a closure is provided therefor to retain the oil about the center core. This closure may comprise a lip 3, composed of any desirable resilient material and secured at one end by a screw 4, the other end thereof adapted to oppose the mouth of the feedway $h^7$, and a spring, as 5, may be inserted under the free end of the lip 3 to insure the closure of the way.

Each end of the wall of the center core C is projected beyond the end of the ribs $h'$ to provide what I have termed the "centering-hubs" $h^8$, which are adapted to be received in an annular recess $d$, formed in the separable hubs D to secure the position of same or to enter a similar recess in the housing $e$ of the side flanges E for a similar purpose.

To secure the several parts in their relative positions, as above described, I have introduced side flanges E, providing a level surface to contact with the sides of the tire B and locking-center A and having a centrally-located square aperture $e$, transverse thereof, of a diameter equal to that of the plates or disks $a^4$ and adapted to fit thereover, the thickness of the flanges permitting them to be turned a fraction of a revolution before binding between the diverging surfaces $a^5$ of the lugs $a^3$ and the side of the center member A, and, as heretofore mentioned, the lugs $a^3$ on the opposite hubs $a^2$ are formed to provide for simultaneous but opposing rotation of the flanges E when locking and unlocking thereon. Thus the side flanges E may be readily locked and unlocked upon the center member A and secure the tire B therebetween. To secure the center core C in position, a housing $e'$ is provided upon each of the side flanges E, and is provided with an annular recess $e^2$, of sufficient diameter to insure a clearance of the lugs $a^3$, and an aperture $e^3$ therethrough of a diameter equal to that of the hub D, which is thus adapted to project therefrom, and a second annular recess $e^4$ may be provided to receive the flange $d'$ of the separable hub D. Thus when the side flanges are locked in position they secure the position of the center core C through the medium of the hub D, which also forms a closure for the end of the oil-chamber thereabout, or the hubs D may be dispensed with and washers, as 6, occupy the position of the flanges $d'$ and a third annular recess $e^5$ in the housing $e'$ receive the centering-hub $h^8$ to insure a central position of the flange E when locked. This construction is clearly set forth in Fig. 2.

When the several parts of the trolley are assembled and locked in position, as explained, a set-screw 7 may be inserted in the housing of each flange to firmly secure the parts in place, though this is not deemed necessary except as an extra safeguard, as the frictional contact of the side flanges with the other elements of the trolley is sufficient to firmly lock the parts in place, especially when the flanges are set up with a wrench, for which purpose the housings $e'$ may be constructed rectangular in form, as indicated upon the drawings.

To introduce oil to the chamber surrounding the center core C without removal of either side flange E, an aperture 8 is provided through the side of either housing $e'$, which registers with the feedway $h^7$ and forms a passage-way for the nozzle of an oil-can, which may be entered therein and pressed upon the lip 3, depressing same to permit the oil to pass into the chamber, and upon withdrawing the nozzle the lip 3 springs back into place and retains the oil in the chamber.

To retard the flow of oil from the chamber to the axle, felt or similar material may be introduced to the channels $h^4$, and upon becoming saturated with the lubricant regulates the feed thereof in the ordinary manner.

The axle F, upon which the trolley is mounted for rotation, is provided at the ends with opposite grooves $f$ in the periphery thereof adapted to receive a lock-plate H and register with opposite edges of a longitudinal slot $k$, provided therein and terminating in an enlarged aperture $k'$, adapted to receive the end of the axle after it is inserted in the aperture $g^3$ of the yoke G, when the plate may be slipped or dropped downward to engage the slot $k$, as indicated in Fig. 3, and an aperture $k^2$ in the lower end of the lock-plate H is adapted to engage a lug $g$, projecting from the side of each furcation $g'$ of the yoke G. The axle F is thus locked from rotation and end movement in the yoke G by a locking-plate at each side thereof, and a rib $g^2$ is provided at opposite edges of each furcation $g'$ to protect the plates H and lugs $g$ from contact with foreign members in the line of travel, which might tear the plates loose and break the lugs.

To insure the delivery of the electric current to the yoke G, a spring, as 10, is secured thereto, having bearing at the upper end against the hub D or E', according to the construction of the housing $e'$, though I ordinarily construct the trolley with the separable hub D, as it can be removed in case it becomes worn by the contact with the spring.

It will be clearly understood that when desirable to remove and replace either or all of the wearing parts of the trolley either or both of the side flanges E are unlocked by reversing the direction of rotation for locking, and when the aperture therein registers with the lugs upon the locking-center the flange or flanges E may be removed, thus giving free access to the several parts of the device, which may be readily slipped apart and replaced, as desired, and are locked or bound together and unlocked by a single turn of the side flanges E.

Having thus described my invention, what I claim, and desire to secure by Letters Patent, is—

1. In a device of the class described, a center member carrying opposite hubs, and wedge-faced lugs on said hubs projecting beyond the periphery thereof, in combination with apertured side flanges adapted to engage the said lugs and to be secured between the wedge-faces thereof and the sides of said center member, substantially as specified.

2. In a device of the class described, a center member with opposite hubs formed integral therewith, and lugs on said hubs projecting over the sides of said member; said lugs having inclined or wedge faces at their inner sides substantially as and for the purpose specified.

3. In a device of the class described, a center member provided with opposite hubs, squared at the outer extremities, and provided with an annular recess between said member and extremity; substantially as and for the purpose specified.

4. In a device of the class described, a center member, provided with opposite annular hubs, mounting a rectangular plate at the outer extremities thereof, the corners of said plates projecting beyond said hubs and having an under surface diverging from the upper; substantially as and for the purpose specified.

5. In a device of the class described, a center member carrying opposite hubs, with lugs thereon projecting beyond the face thereof, the under surface of said lugs diverging from the upper; substantially as and for the purpose specified.

6. In a device of the class described, a center member with opposite hubs having lugs opposed to the sides of said member, the under surface thereof diverging from the upper, a removable tire surrounding said center member, and side flanges adapted to engage said lugs and bind upon said tire and member; substantially as described.

7. In a device of the class described, a center member having opposite hubs, squared at the outer extremities, each provided with an annular recess between said member and extremity, the projecting corners of said extremities having the under surface diverging from the upper, a removable tire about said member, and side flanges adapted to engage between said diverging surfaces and member, and secure said tire; substantially as described.

8. In a device of the class described, the combination, with the locking-center carrying lugs mounted on opposite hubs thereof, and a removable tire thereon, of side flanges apertured to pass said lugs and receive said hub and to be turned to lock between said lugs and center, and secure said tire; substantially as described.

9. In a device of the class described, the combination with a center member having opposite hubs, and lugs projecting from said hubs over the adjacent sides of the member, said lugs on the respective hubs, having oppositely-diverging or wedge faces, of side members or flanges adapted to engage between said diverging faces and member and to be secured respectively by a right-and-left hand turn thereof, substantially as specified.

10. In a device of the class described, a trolley, an axle, a yoke for the support thereof having lugs on the furcations thereof, lock-plates adapted to receive opposite ends of said axle and to drop and engage therewith and to receive said lugs when dropped, and lock said axle from rotation and end movement; substantially as described.

11. In a device of the class described, a trolley, an axle having opposite grooves at each end, a yoke supporting said parts and having lugs thereon below the ends of said axle, lock-plates apertured to receive said ends and slotted to drop and engage said grooves, and a second aperture therein to engage said lugs when said plates are lowered; substantially as described.

12. In a device of the class described, the combination with a locking-center of a center core having longitudinal ribs thereon fitting a central aperture in said locking-center with transverse depression thereof communicating with channels between said ribs, and oilways from said channels to the bore of said center, and means engaging said locking-center to secure said parts together and close the ends of said channels and form a chamber between said core and locking-center; substantially as described.

13. In a device of the class described, the combination with a locking-center, mounting lugs on opposite hubs thereof and having a central aperture, a removable tire about said center, a center core with longitudinal ribs fitting said aperture, centering-hubs thereon and a center bore, separable hubs with a similar bore and recessed to receive said centering-hubs and flanged to form a closure at the ends of said ribs to provide an oil-chamber about said center core; of side flanges apertured to pass said lugs and housings thereon recessed to receive the flanges of said separable hubs and apertured for the projection thereof, said flanges adapted for simultaneous but opposing rotation to engage said lugs and lock and bind said parts together; substantially as described.

14. A device of the class described comprising a center member provided with locking-lugs, a removable tire thereon, a center core therein, separable hubs at the ends of said core, and side flanges with housings thereon, and adapted to engage said locking-lugs and interlock therewith and bind all of said parts together; substantially as shown and described.

15. A device of the class described comprising a center member provided with opposite hubs, and lugs on said hubs, a removable tire thereon, a center core with longitudinal ribs fitting a central aperture in said member, separable hubs at the ends of said core and ribs, and side flanges apertured to receive said lugs and adapted to be turned and engage therewith, and a housing thereon to engage said separable hubs, and a center bore through said core and separable hubs; substantially as shown and described.

16. In a device of the class described, the combination of an axle, means for locking the same against rotation, an annular center member carrying opposite hubs provided with wedge-faced lugs projecting beyond the periphery thereof, a tire detachably secured upon said member, a core detachably secured therein, and detachable side plates engaging the lugs of said center member and adapted to be secured between the wedge-faces thereof and the sides of said center member by a right-and-left-turning movement of the respective plates, substantially as specified.

17. In a device of the character described, the combination of an axle, means for carrying the same, and for securing it against rotation, an annular center member carrying opposite hubs provided with wedge-faced lugs projecting beyond the periphery thereof, a central core constructed to form a lubricant-chamber within the center member, a tire surrounding said center member, and side flanges engaging the said lugs and adapted to be secured between the wedge-faces thereof and the sides of said center member, substantially as specified.

In testimony whereof I affix my signature in presence of two witnesses.

OLOF W. SWANSON.

Witnesses:
A. L. MANNING,
WM. B. PERRIN.